INVENTORS,
CLARENCE D. GLOVER
LAWSON B. JONES

McLean, Morton, & Boustead
ATTORNEYS.

United States Patent Office 3,364,681
Patented Jan. 23, 1968

3,364,681
POWER PLANT
Clarence D. Glover, 1918 Maple Ave. 33605, and Lawson B. Jones, 326 Hyde Park Ave. 33606, both of Tampa, Fla.
Filed Aug. 24, 1965, Ser. No. 482,183
15 Claims. (Cl. 60—97)

ABSTRACT OF THE DISCLOSURE

A power plant capable of providing high output power to a drive shaft from a plurality of engines of lower power. The engines are located around the periphery of, for instance, two horizontal power wheels to rotate the power wheels about horizontally displaced axes. The drive shaft is driven by gearing from the two power wheels. Different gear ratios can be provided to permit selection of maximum output power and speed. To provide gyroscopic stability the two power wheels can be rotated in opposite directions.

---

Figure 1:
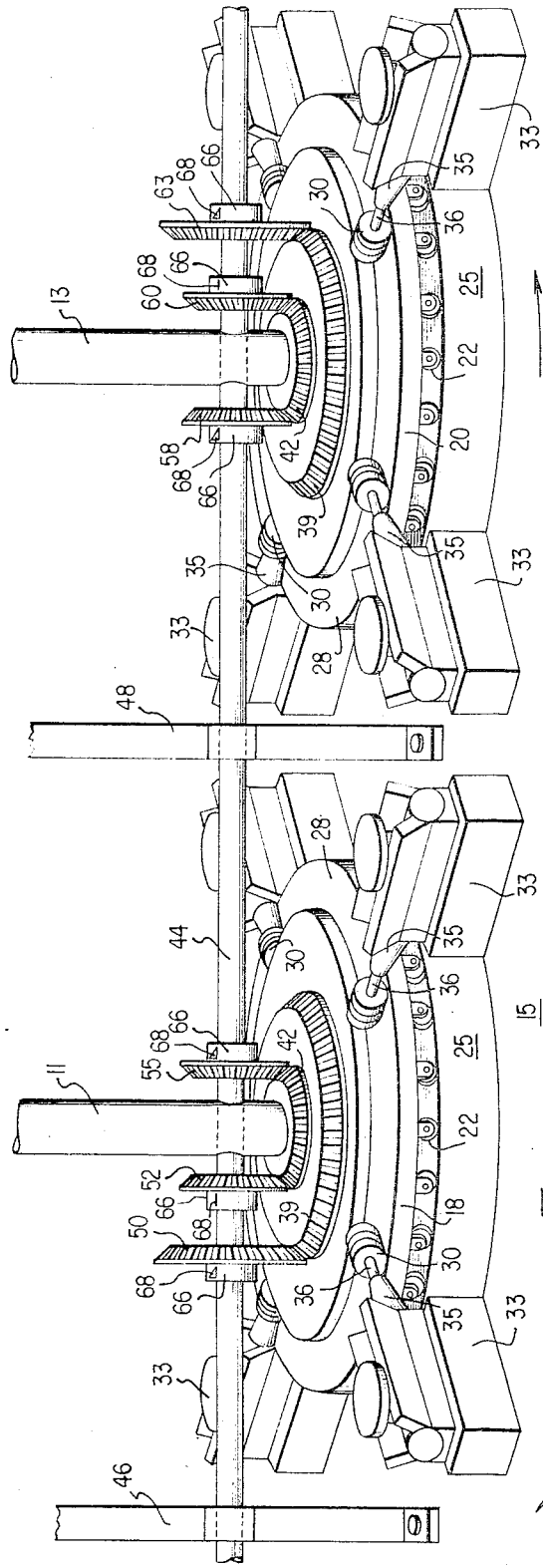

This invention is a novel power plant of particular value, for instance, in marine propulsion. The apparatus provides means for producing a large force, of value, as an example, for powering a large ship, by the use of small inexpensive engines, in particular commercial, mass-produced internal combustion engines. Further, this invention provides for improved stability of marine vehicles due to the nature and arrangement of the power plant.

Copending patent application Ser. No. 299,619, filed Aug. 2, 1963, U.S. Patent No. 3,209,543, provides a means for accumulating force from a plurality of relatively low horsepower engines. The copending application describes a generally horizontal rotating power wheel, the wheel being engaged at or near its periphery with a plurality of stationarily-mounted, wheel-moving internal combustion engines, which may be of any convenient type, for instance, gasoline or diesel, with appropriate transmission means to provide for a relatively continuous rotary power input to the power wheel. The engines may be positioned so that the rotary power shaft of the engines is perpendicular to a tangent of the edge of the power wheel. The horizontal rotating power wheel can be made of steel-reinforced concrete or some similarly dense material and supported by and riding on, for instance, metal wheels or other bearings on a track made of metal or other low-friction material.

It has now been discovered that in an apparatus of the type disclosed in said copending application, the provision of two power wheels, preferably rotating in opposite directions, can provide not only power, but greatly increased stability, especially in marine propulsion. More than two power wheels can be employed, particularly pairs of two wheels, and each rotating in opposite directions, if desired.

The need for marine engines of, say, at least about 800 horsepower, usually is not widespread enough for internal combustion engines or even steam engines to be made by mass production methods, to supply such horsepower. The cost of such engines, therefore, frequently is much higher than would be the cost of the same amount of horsepower-producing facilities using smaller engines manufactured by assembly-line techniques. Further, in order to provide for down-time or emergencies, conventional marine propulsion power plants frequently use duplicate engine facilities, at, of course, double the capital investment, so that full power will be available even if one engine is shut down for repairs. Thus, twice the horsepower needs may accordingly have to be made available aboard ship. The apparatus of this invention provides a plurality of small prime mover engines and arranges them in an easily replaceable or disengageable manner. Thus, the "spare," if any, to be kept on hand causes just a slight addition in capital outlay, and, since the plurality of engines or individual power sources of the invention are stationary, many repairs can be made while the system is in operation. The engines preferably employed are standard mass produced internal combustion engines of the automotive or truck type say, for example of 100–600 horsepower.

The power wheel performs several functions in the apparatus of this invention. It serves to combine and multiply the power from the individual internal combustion engine power sources; it transmits power to a drive shaft; it may act as a member of a plurality of gear sets; and it may provide gyroscopic action for ship stabilization. The power wheel, as mentioned, preferably is made of steel-reinforced concrete, the high density of the concrete or other material being a significant contribution to the above-described gyroscopic action. Also, a high density wheel provides for greater realization of the advantages of inertia in power transmission than is obtained by the use of lighter materials. Concrete may be readily installed, even in the engine room of existing ships, by being cast in place. Also, concrete provides a high coefficient of friction so that frictional drive means can be used with advantage, rather than more positive mechanical linkages which often require great precision in their original installation and repair. The wheel may preferably have dimensions such that its diameter will be at least about 8 to 12 times its thickness, preferably at least about ten times the thickness of the wheel. As an example, a wheel weighing about 65 to 68 tons can be used satisfactorily with a series of four truck diesel engines each capable of generating about 200 horsepower.

The individual sources of motive force or engines at each wheel are preferably equal in their work output and equally spaced around the periphery of the wheel to avoid any imbalance. The said engines are ideally of the fluid-transmission type which are well-suited for continuous rotary motion. These motors operatively contact or rotatably engage the horizontal, rotating wheel by means of, for instance, rubber-tired wheels driven by the rotary motion of the said engines. The rubber tires may be selected because of their availability, cheapness and great coefficient of friction with the concrete wheel. The coefficient of friction between rubber tires and concrete is about 0.96 while between steel and steel, the coefficient is about 0.149.

In this invention, the power wheels are provided on one of their exposed faces with driven power transmission means, for example, a series of gear teeth, advantageously beveled and arranged annularly around a given wheel's axle. Preferably, a plurality of annular, concentrically-arranged gear teeth sets are provided to allow for transmission of power to a shaft at fast or slow speeds as desired. This power transmission shaft usually will be generally horizontal, that is, more or less perpendicular to the axle of the wheels, and will be provided with driving means, such as gears, for association with the driven means borne by the power wheels. Preferably a plurality of such means are provided to give the speed-power ratios desired and also to permit reversing the direction of rotation of the power shaft without reversing the direction of rotation of the power wheels. The driven power transmission means associated with each power wheel is usually located inwardly of the periphery of the respective wheel and generally the effective circumference of the driven means is less than one-half the outer circumference of its power wheel.

It will be understood that the power wheels often will be substantial duplicates of each other with the separate members of the pairs being arranged for rotation simultaneously in the same or opposite directions. In a simple embodiment of this invention, the power wheels can be arranged on a normally horizontal deck fore and aft of each other in the hold of the ship. The main power shaft can be perpendicular to the axles of the power wheels and disposed generally horizontally above the power wheels. Where a ship of shallower draft is to be powered by the use of the power wheels of this invention a more sophisticated arrangement may be employed with advantage. In such embodiments the power shaft may, for instance, be placed below the power wheels and, also, the power shaft may slope toward the stern of the ship. Where, for example, twin screws are provided, a separate wheel or wheels may transmit power to a single one of a plurality of power shafts. In such situations the power wheels may be out of line with each other fore and aft or may even be arranged port and starboard of each other in ships of sufficient beam.

Figure 2:
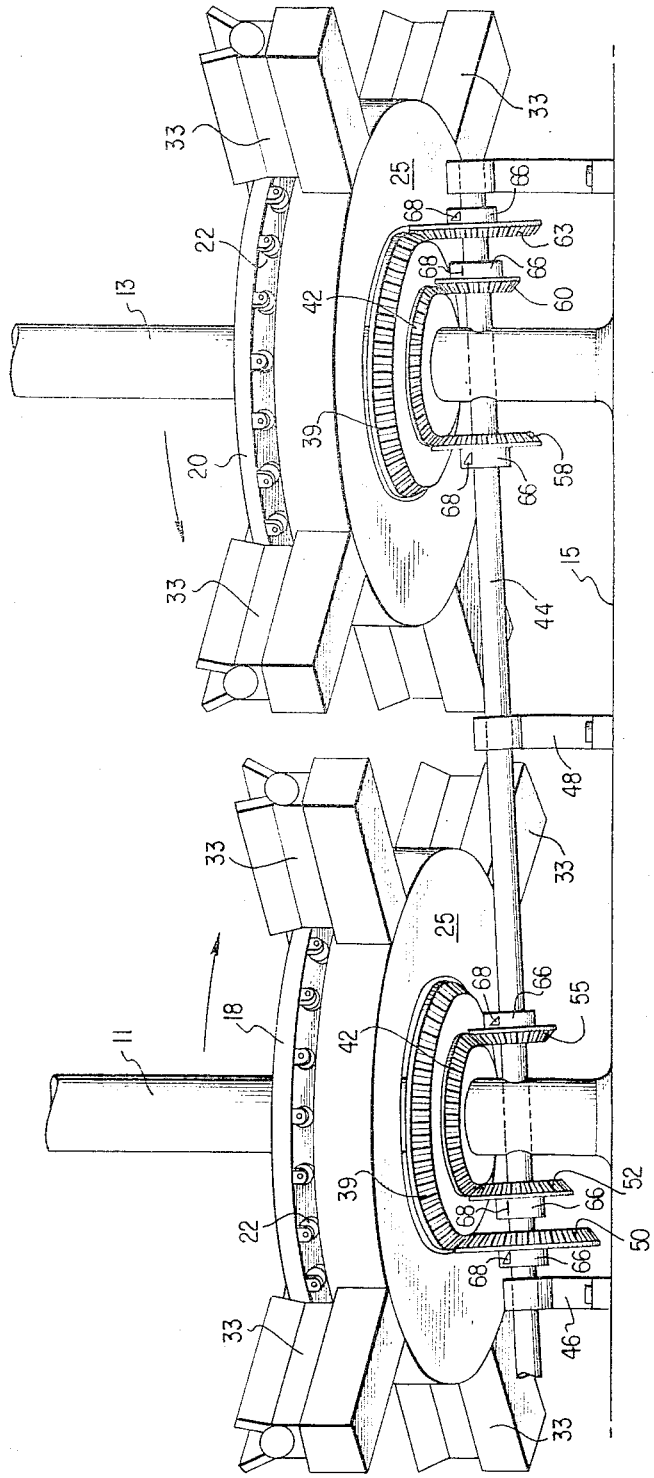

This invention may be better understood by reference to the accompanying drawings in which:

FIGURE 1 is a perspective view of an embodiment of the apparatus of this invention having an overhead power shaft, and FIGURE 2 is a perspective view of an embodiment of this invention having a lower, sloping power shaft.

In the drawings, vertical shafts 11 and 13 are rigidly attached to the deck 15, keel, or other rigid horizontal member of a ship or other support as might be provided in a stationary power plant. These fixed shafts 11 and 13 comprise axles for the concrete wheels 18 and 20. Suitable bearings and lubrication may be provided for low friction rotation of the wheels 18 and 20 about axles 11 and 13, e.g., in opposite directions as shown by the arrows. Wheels 18 and 20 are supported by bearings such as the rollers 22, on stationary platforms 25 which also may be made of concrete.

Wheels 18 and 20 are provided with the outer track portions 28 on which tires 30 run. The track 28 should be sufficiently abrasive that an adequate frictional contact between the track and tires 30 may be obtained. The engines 33, as illustrated, are conventional internal combustion engines, associated, if desired, with fluid transmission means 35, to drive shafts 36 to which the tires 30 are affixed. As illustrated in FIGURE 1, the top surface of wheels 18 and 20 may be provided with beveled gear sets 39 and 42.

Power shaft 44 may be supported by the support members 46 and 48 and may be journalled to pass through the stationary axles 11 and 13. The power shaft 44 is provided with the beveled gears 50, 52, 55, 58, 60 and 63 for transmission of power from the wheels 18 and 20 to the power shaft 44. These gears are connected to the power shaft 44 by sleeves 66 which contain members for rigid or at least operative connection to and disengagement from the shaft 44. For example, electro-magnets (not shown) may be contained in sleeves 66, which when actuated by electricity from leads (not shown) will cause magnetic coupling of the proper sleeves 66 with shaft 44, which usually is made of a ferromagnetic metal. Alternatively, each sleeve 66 may contain one or more retractable splines 68 which are in the retracted position when the sleeve is operatively disconnected from the shaft 44, as illustrated on gears 50, 55, 58 and 63. These splines may be moved to the extended position, illustrated on gears 52 and 60, by means, for example, of hydraulic servo-motors (not shown) contained within sleeves 66 or shaft 44. Slots are provided in shaft 44 for reception of the splines. It will be apparent also that the same kind of rigid connection between shaft and sleeve can be obtained by having the retractible-extendible splines in the shaft 44 while the sleeves 66 are suitably provided with slots for entry of the spline.

The connecting means, as explained, are remotely actuatable to put the proper gears into operative connection with the power shaft in response to the speed, power and direction of shaft rotation desired. For example, with only gears 52 and 60 simultaneously engaged with the power shaft 44, a low forward speed may be imparted to the ship. Gears 50 and 63 may be engaged and the other gears disengaged to give a somewhat higher forward speed, without a change in the speed or direction of the power wheels. Likewise, without changing the speed or direction of the power wheels, the gears 55 and 58 may be simultaneously engaged and the other gears disengaged to give a slow reverse speed to the ship. Further pairs of gears may be provided to give a wider choice of speeds.

As will be noted, the gearing thus described, which is driven by the power wheel may serve to change the speed and/or direction of the ship without a change in the speed or direction of the power wheel. It will be noted also, that a single power wheel can serve to propel the ship when necessary or desirable. Likewise, the speed and direction of the ship may be changed without a shift in the power-wheel driven gearing, by adjusting the speed or direction of rotation of the power shafts 36, whether through a change in engine speed and/or direction or through changes in the transmission means 35. Although the power wheels are depicted as rotating in opposite directions they may also be run in the same direction and by proper choice of gearing the various maneuvers described above can be obtained, expecially if gears 50 and 63 are duplicated by similar gears located on the opposite side of each of the power wheels.

In FIGURE 2, like numbers designate the like members of FIGURE 1; thus the platforms 25 for wheels 18 and 20 are annular and the gear teeth sets 39 and 42 are provided on the underside of each wheel. Suitable supports (not shown) are provided for the platforms 25 and engines 33. As can be seen, the shaft 44 slopes toward the left, which may be toward the rear of the ship, electric generator, etc. Also, as can be seen, the wheels 18 and 20 may be provided in different horizontal planes to provide for gears 50, 52 and 55 of about the same size as gears 63, 60 and 58, respectively. Minor differences in the size of gears in a pair may be made up for in several ways, for example, by a variation in the size of each tooth to insure that each gear in a pair has an equal number of teeth or by adjusting the speed and power being transmitted from the engines associated with one or the other of the wheels.

The following example illustrates the use of the invention. Two steel-reinforced concrete power wheels are mounted upon steel bearing wheels running on a steel track, supported by a concrete slab set onto a deck in the hold of a ship. The outside diameter of each wheel is 30 feet and the thickness is 3 feet. An outer track is provided on each wheel and is 3 feet wide and 1½ feet thick. Equally spaced around the periphery of each track are placed four standard V-8 gasoline automobile engines, each mounted on a concrete block. The engines are supplied with variable-speed, fluid drive transmissions of the hub-mounted type which are lever-controlled and transmit power to 14 inch diameter tire wheels. Each engine has an indicated horsepower of 212 and a brake horsepower of 179. The coefficient of friction between the concrete wheel and the rubber tires is 0.96, therefore a force of 0.96×179 or about 172 H.P. is transmitted by each engine to each power wheel.

It is claimed:

1. A power plant comprising two generally horizontal power wheels adapted to rotate about horizontally displaced axes, a power shaft operatively rotated by said power wheels, a plurality of internal combustion engines located around the periphery of each of said wheels, said engines being mounted so that each power wheel rotates with respect to said engines, each of said engines being in power-transmitting contact with the periphery of its respective wheel and positioned to move said respective wheel in rotational direction.

2. The power plant of claim 1 in which each power wheel is rotated by means of frictional contact with rubber tires driven by the said engines and each power wheel is supported by wheels running along a track.

3. The power plant of claim 1 in which the power wheels rotate in the same plane.

4. The power plant of claim 1 in which the power shaft is mounted above the power wheels.

5. The power plant of claim 1 in which the power shaft is mounted below the power wheels.

6. The power plant of claim 1 in which power transmission means is located inwardly of the periphery of each of said wheels and operatively engages said power shaft.

7. The power plant of claim 6 in which each of said wheels carries two sets of gears, one set for imparting lower speed to said shaft and one set for imparting higher speed to said shaft.

8. The power plant of claim 6 in which the power transmission means selectively provides for stopping of the power shaft, imparting a change in speed of said shaft, and reversal of rotational direction of said shaft.

9. The power plant of claim 8 in which said power transmission means selectively operates without change of speed and direction of rotation of said power wheels.

10. The power plant of claim 1 in which the power wheels rotate in opposite directions.

11. The power plant of claim 6 in which the power wheels rotate in opposite directions.

12. The power plant of claim 7 in which the power wheels rotate in opposite directions.

13. The power plant of claim 8 in which the power wheels rotate in opposite directions.

14. The power plant of claim 6 in which means are provided to engage and disengage said power shaft and said wheels while said wheels are rotating.

15. A power plant comprising two generally horizontal power wheels adapted to rotate about horizontally displaced axes, each of said power wheels supported by support wheels on a track; a power shaft; at least one set of gears located inwardly of the periphery of each of said power wheels; means for selectively engaging and disengaging said gears to said power shaft to permit changes in speed and direction of rotation of said power shaft without change of speed and direction of rotation of said power wheels; a plurality of internal combustion engines located around the periphery of each of said power wheels and mounted so that each power wheel rotates with respect to said engines; and a plurality of rubber tires driven by said engines and engaging said power wheels to rotate said power wheels.

References Cited

FOREIGN PATENTS 228,942  11/1910  Germany.
910,185  11/1962  Great Britain.

MARTIN P. SCHWADRON, *Primary Examiner.*

ROBERT R. BUNNEVICH, *Examiner.*